United States Patent
Talmage, Jr.

(10) Patent No.: US 6,776,373 B1
(45) Date of Patent: Aug. 17, 2004

(54) AIRCRAFT ESCAPE CABIN

(76) Inventor: Robert N. Talmage, Jr., P.O. Box 2325, Acworth, GA (US) 30102

( * ) Notice: Subject to any disclaimer, the term of this patent is extended or adjusted under 35 U.S.C. 154(b) by 0 days.

(21) Appl. No.: 10/408,811

(22) Filed: Apr. 7, 2003

Related U.S. Application Data
(60) Provisional application No. 60/447,932, filed on Feb. 19, 2003.

(51) Int. Cl.$^7$ .............................................. B64D 25/12
(52) U.S. Cl. .......................................... 244/140; 244/2
(58) Field of Search ....................... 244/2, 118.2, 137.4, 244/140

(56) References Cited

U.S. PATENT DOCUMENTS

| | | | |
|---|---|---|---|
| 2,702,680 A | * | 2/1955 | Heinemann et al. ........ 244/140 |
| 3,006,576 A | | 10/1961 | Elijah |
| 3,067,973 A | | 12/1962 | Halsey et al. |
| 3,227,399 A | | 1/1966 | Dastoli et al. |
| 3,289,974 A | | 12/1966 | Cohen et al. |
| 3,298,633 A | | 1/1967 | Dastoli et al. |
| 3,703,265 A | * | 11/1972 | Troitino ........................ 244/13 |
| 3,881,671 A | * | 5/1975 | Bouchnik .................... 244/140 |
| 3,999,728 A | | 12/1976 | Zimmer |
| 4,580,746 A | * | 4/1986 | Peck ........................... 244/140 |
| 5,297,761 A | | 3/1994 | Kendall, Jr. et al. |
| 5,356,097 A | | 10/1994 | Chalupa |
| 5,526,999 A | | 6/1996 | Meston |
| 5,568,903 A | | 10/1996 | Pena et al. |
| 5,975,464 A | * | 11/1999 | Rutan ......................... 244/120 |
| 6,382,563 B1 | | 5/2002 | Chiu |

\* cited by examiner

Primary Examiner—Robert P. Swiatek
(74) Attorney, Agent, or Firm—Walter A. Rodgers

(57) ABSTRACT

An Aircraft Escape (AEC) is designed for manned atmospheric or space vehicles having a fly away capability at any time during the flight of the parent aircraft. The AEC houses the crew, passengers, life support systems, aircraft flight controls, propulsion, navigation instruments, communications equipment, and deceleration devices to permit safe landing of the escape cabin on land or water. A rocket or mechanical device provides the means to actively separate the escape cabin from the parent aircraft during an emergency.

11 Claims, 3 Drawing Sheets

AIRCRAFT ESCAPE CABIN

The benefits under 35 U.S.C. 119 are claimed of provisional application 60/447,932 filed Feb. 19, 2003.

BACKGROUND OF THE INVENTION

Emergency egress from an aircraft has typically involved ejection seats. Ejection seats offer quick egress, yet have many dangers related to the nature of the method such as the occupant being exposed to injury from impact with aircraft structures during separation, deceleration forces, violent spinning, and environmental factors including windblast, depressurization, extreme temperatures, and lack of oxygen. When multiple ejection seats are involved, sequencing of ejections is critical and the risks are increased.

Another avenue for escape involving aircraft personnel opening a hatch and manually bailing out using a parachute poses additional risks. Releasing seat restraining devices and maneuvering to the hatch in a plane out of control and experiencing violent forces can make it impossible or very dangerous to even reach the hatch. Another risk is the issue of the time required to bail out when mere seconds are critical during an emergency situation. Concepts, which involve an escape pod solve some of the environmental dangers, yet still require the crewmembers to safely reach the pod.

To date, stable ejection seats have been made which include encapsulating seats used on the B58A and XB-70 to protect the crew from aerodynamic forces. Ejectable cockpits have been used on the F-104 and FB-111A to protect the crew during escape at supersonic speeds; however, no ejection seat or actual capsule has been produced with the ability to fly and control the location of a landing.

SUMMARY OF THE INVENTION

The disadvantages of the prior art are overcome with this invention for manned vehicles whereby the crew and the passengers are carried in the Aircraft Escape Cabin (AEC) capable of flight independent of the parent vehicle such that all occupants can escape together at any altitude or speed, perform aerodynamic flight, and touch down safely on land or water.

This invention relates to AEC which contains the crew, passengers, the cockpit, aerodynamic surfaces, flight controls, navigation instruments, communication equipment, life support equipment, deceleration devices, survival items, flotation devices, and mechanical and/or rockets to actively separate the AEC from the parent vehicle of which it is an integral and functioning part. The weight of an aircraft is so critical that any practical escape system must be integrally designed into the vehicle such that the systems perform duel roles, ie, operate both during normal flight mode and escape mode. The basic design of this invention works as well for a vehicle with one or numerous occupants.

An object of this invention provides for thermo protection, insulation, and a Jettisonable Maneuvering Rocket (JMR) segment for escape, control and reentry from a space vehicle. The JMR segment provides fuel storage and rockets for maneuvering the parent space vehicle during normal operation modes and is separated from the parent space vehicle with the AEC to provide propulsion when an escape is necessary during an orbital mode. Upon entering the atmosphere where the AEC has aerodynamic control, the rocket segment is jettisoned to reduce weight and avoid the dangers of landing with explosive fuel on board.

Also, guillotined devices are used to sever control lines, linkages, and wiring to allow separation of the AEC from the parent vehicle. The AEC can be attached to the parent vehicle with explosive bolts. An additional method, both unique and preferred, would consist of multiple, non-locking, one directional release, linking and stabilizing devices and one attachment/release mechanism that when released allows the AEC to move along its designed release direction The advantage of this unique method of attachment versus using explosive bolts is its simplicity, less chance of failure, manual operation capability, and design whereby an unexpected explosion of the parent vehicle will naturally force the AEC along the release direction of the non-locking attachment devices and propel the AEC from the explosion without any action from the crew.

Deceleration devices, such as a stabilization-brake parachute and recovery parachute, which are well known to those skilled in the art, are necessary. Once the AEC has reached the desired area to touch down, these chutes can be deployed to lower the AEC whereby impact attenuation devices in the nose can cushion the landing.

In accordance with this invention, deployable wings may be utilized to extend the range and aerodynamic performance of the AEC. These wings would deploy similar to a cruise missile and the aerodynamic control will be provided by a unique feature of this invention, a "Caneleron," which operators as a canard for the parent vehicle and as an elevator/elevon for the AEC when separated from the parent vehicle.

A further advantage of this invention is the separation of the AEC from the main wing of the parent vehicle. In this configuration, the optimum weight and balance can be designed into the AEC. Subsequently, the aircraft designer can calculate in the contribution of the caneleron with the rear elevator to achieve an excellent weight and balance envelope for the parent vehicle. The preferred vehicle will also use a conventional rear elevator; however, some designs may only use the canard or caneleron and will not have a rear elevator. The distance between the caneleron center of lift, relative to the wing and rear elevator is a major design feature, embodied in this invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention

DETAILED DESCRIPTION OF THE INVENTION

Figure 1:
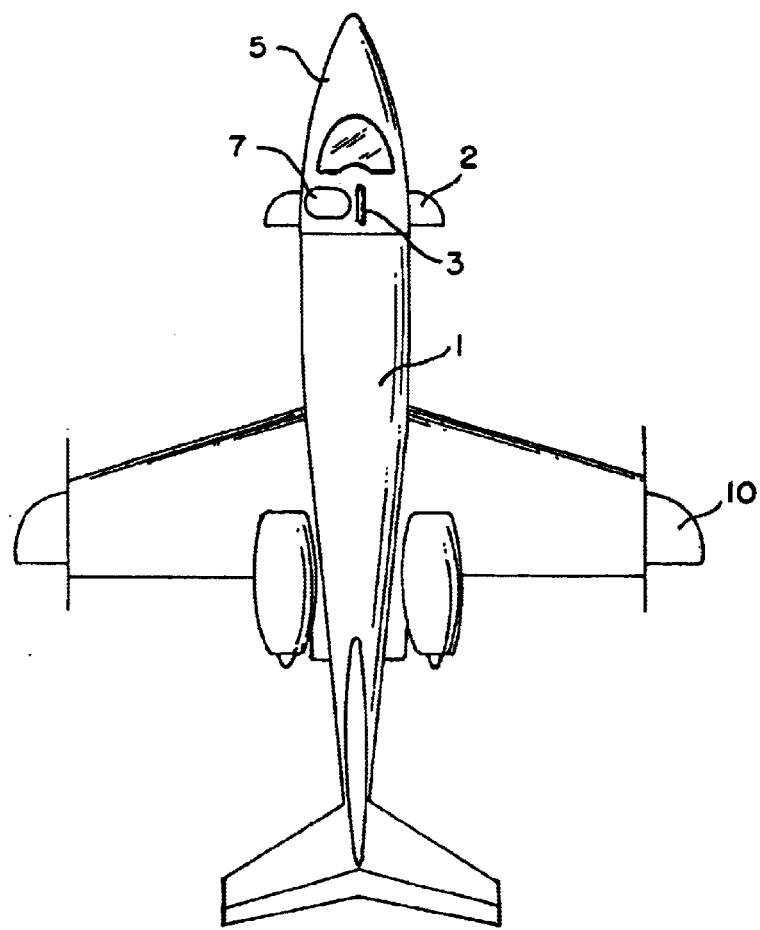
FIG. 1 is a plan view of one embodiment of the invention attached to the parent vehicle with fuselage, flight controls and engines.

In FIG. 1, the numeral 1 designates the parent vehicle and the numeral 2 designates the "Caneleron" (a control surface specific to this invention that acts as a canard during normal operations of the vehicle and then functions as elevator and ailerons for the Aircraft Escape Cabin (AEC). The caneleron 2 can be designed with the moveable control section attached to a fixed stabilizer or without a fixed stabilizer and can operate as an independent control surface that rotates around a lateral axis to provide pitch and roil control Vertical stabilizer 3 can be fixed or also incorporate a control surface to provide yaw control. The parent vehicle has ailerons 10 and conventional tail surfaces.

Figure 9:
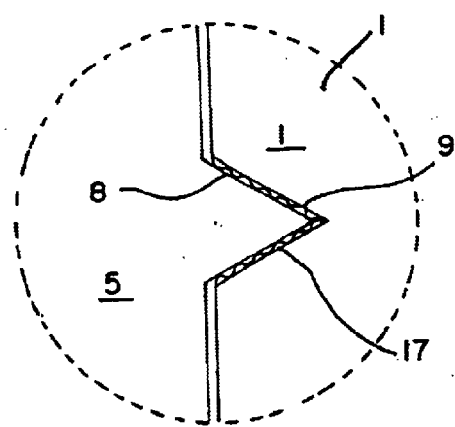
FIG. 9 is an enlarged view of one embodiment of a nonlocking, one directional release, linking and stabilizing device as viewed along line B—B in FIG. 7.

The attachment design of this invention embodies nonlocking, one directional release, linking and stabilizing devices 8(male), 9(female) and a single attachment/release mechanism 16. This invention provides one fail-safe manual release lever, natural explosive separation from the forces resulting from an unexpected vehicle explosion, isolation for fuselage structural loads and the ability to accommodate for thermal expansion variations between the AEC and parent vehicle. Cushioning material 17 will allow for thermal expansion and contraction between the AEC and the parent vehicle yet will transfer all loads in every other direction except the release direction, straight forward. The embodiment of a nonlocking, one direction release, linking and stabilizing device shaped like a cone, wherein device 8 nests into device 9 and which act to stabilize the AEC with respect to the parent vehicle, is illustrated in FIG. 9. Various locations around the different interfacing of the two vehicles will favor different shapes, yet all will employ two similar shapes whereby the male recesses into the female counterpart.

Simplicity and manual fail-safe operating capability are essential for crew safety. Numerous fatalities and injuries have occurred in prior escape systems due to escape sequencing malfunction, damaged caused by the emergency to one or multiple components of the escape system, or inadvertent firing of an escape system component.

The single attachment/release mechanism embodied in this invention can be operated manually and/or with a switch. The release direction of the mechanism is forward along the longitudinal axis of the vehicle (straight ahead) which is This identical to the release direction of the non-locking, one directional, linking and stabilizing devices 8, 9. Military aircraft carrying high explosives and rocket vehicles carrying volatile fuels must each consider a natural explosive escape resulting from a catastrophic explosion of the parent vehicle occurring faster than the pilot can initiate the escape sequence. This explosive force acts on the AEC in the same release direction for normal separation. Since all normal forces acting on the AEC such as wind load, caneleron forces, and landing impacts are perpendicular or opposite in direction to the non-locking, one directional release, linking and stabilizing devices 8, 9 the load required of release mechanism 16 is minimal. For this reason, the anchor point of the attachment/releases mechanism 16 can be designed to easily accommodate normal loads yet be designed to fail under the violent forces resulting from an explosion.

Isolation of the AEC from parent vehicle structural loads eliminates problems associated with dynamic structural loads traveling through the AEC and offers optimum structural integrity of the AEC to reduce weight. Minimizing weight of the AEC is critical since requirements for the parachutes and impact attenuation devices are based on weight.

With regard to thermal expansion and contraction associated with supersonic and reentry vehicles, the isolation embodied in this invention of the AEC from the parent vehicle eliminates thermal dynamic stresses and offers the best method to connect the AEC to the parent vehicle. Isolating the AEC from the forces being transmitted from the parent vehicle greatly improves the integrity of the AEC. Since loss of cabin pressure above 60,000 feet results in instant death, isolation from dynamic loads and optimum cabin integrity avoids many of the problems associated with cabin integrity and aircraft structural loads. Vehicles which experience high dynamic loads and thermal expansion are prone to experience problems with loss of cabin pressure and breeches in cabin integrity.

Figure 2:
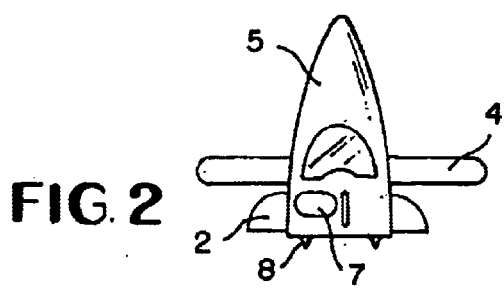
FIG. 2 is a plan view of one embodiment of the invention detached from the vehicle with deployable wings.
Figure 3:
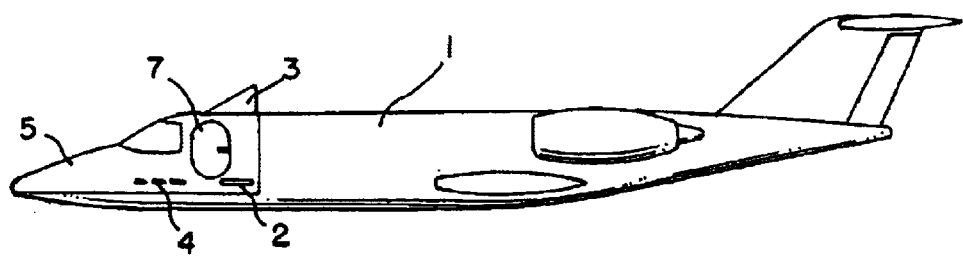
FIG. 3 is a elevational view of one embodiment of the invention attached to the parent vehicle.
Figure 4:
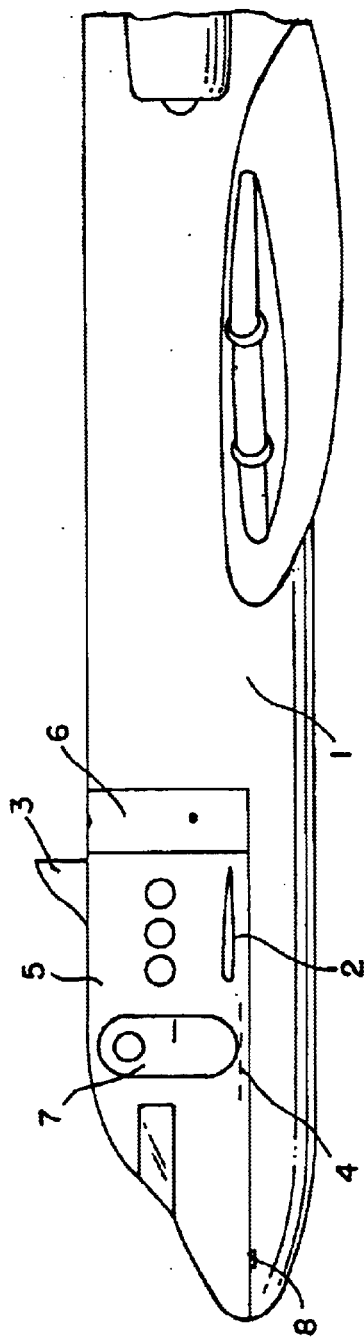
FIG. 4 is a view of one embodiment of the invention with a Jettisonable Maneuvering Rocket (JMR) and a larger cabin for passengers attached to the parent vehicle.
Figure 6:
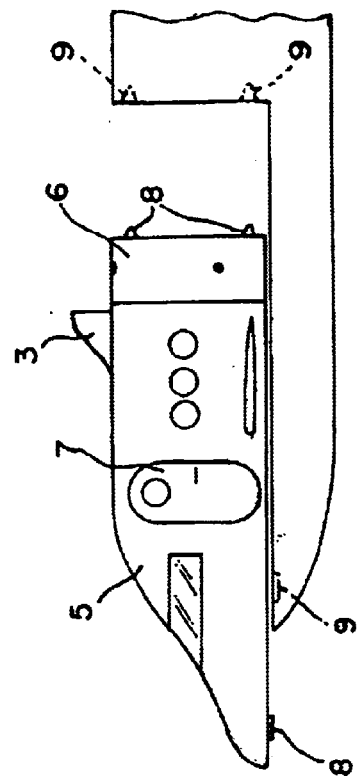
FIG. 6 is a view of one embodiment of the invention separating from the parent vehicle with JMR attached.
Figure 5:
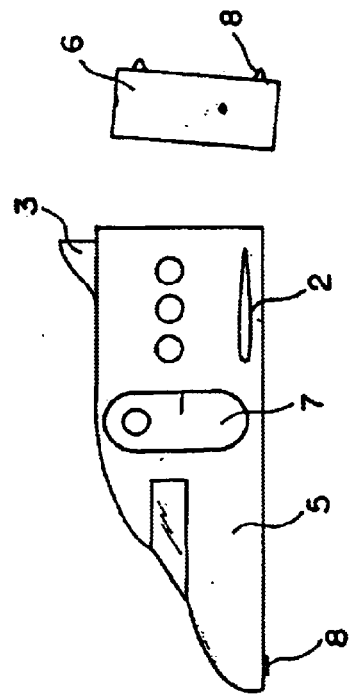
FIG. 5 is a view of one embodiment of the invention separated from the parent vehicle and detached from the JMR.
Figure 7:
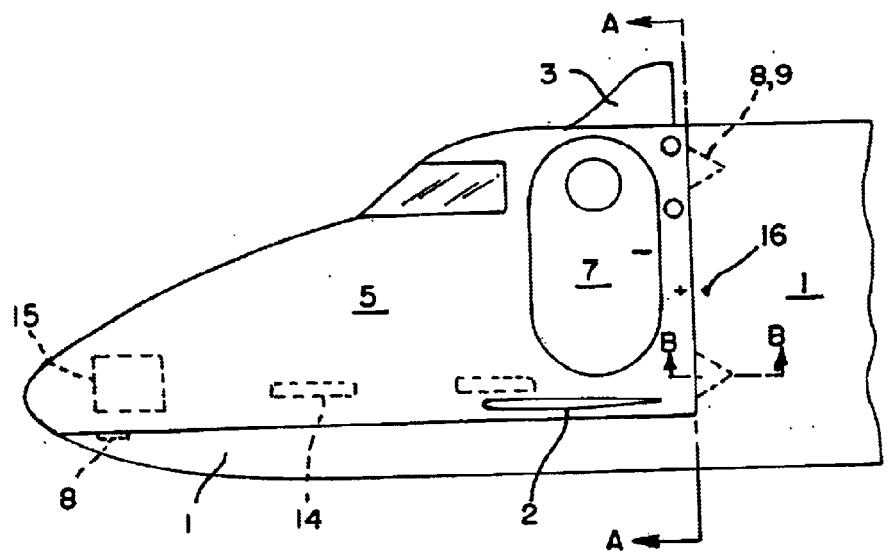
FIG. 7 is an enlarged view of one embodiment of the invention attached to the parent vehicle.
Figure 8:
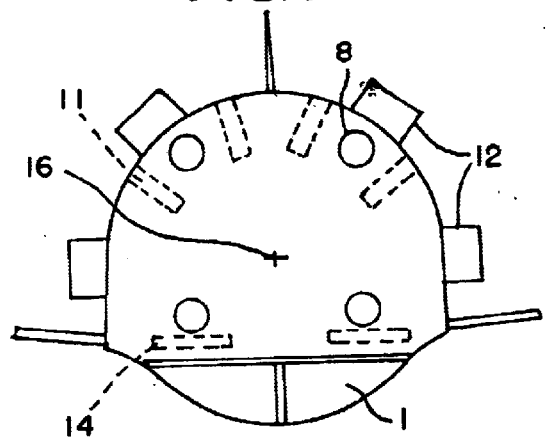
FIG. 8 is a sectional view taken along the line A—A in FIG. 7.

FIG. 2 is a particular embodiment of this invention with deployable wing 4 to increase AEC range and maneuvering ability. Impact attenuation device 15 is located in the nose to deploy upon ground impact. Stabilization-brake! and recovery parachutes devices 11 are located around the rear of the AEC as shown and on the bulkhead of the back of the cabin separating the fuselage. These parachute devices can be operated automatically with the escape-sequencing device or with switch or manual operational An additional embodiment of this invention is that each parachute device can be detached manually or by a switch A unique feature of this invention is the tremendous failsafe capability due to the new attachment technique, which can separate automatically as required in an explosion, or operated totally manually in the event of a total system failure.

Structural loads for the front wheel are carried by the fuselage and not the AEC. All downward natural loads on the AEC such as weight and landing impacts are carried in compression loads of the invention sitting on the fuselage. One embodiment of this invention is the parallel sharp blades located in the front and back of control lines and cables on separate opposing sides. One blade is attached to the bottom of the AEC and its congruent blade is attached on the fuselage below. The movement of the AEC along its release direction (straight forward) will move these two blades together so as to insure manual separation of attachments in the event that normal escape sequencing is not functional.

Still another component of this invention is the Jettisonable Maneuvering Rocket (JMR) segment 6, which is necessary for aircraft and space vehicles, which fly near or above orbital speeds. Without the drag from the atmosphere, the AEC must have rocket engines to maneuver and decelerate. The fuel and rocket engines are located in section 6. This invention allows the rockets to function for control during normal aircraft operations as well as during an emergency. Once the AEC has reentered the atmosphere and no longer needs the JMR segment, it can be separated by firing explosive bolts. Incinery guillotine devices familiar to those skilled in the art would be able to separate all connections between the AEC and parent vehicle, or rocket segment. Separation of the AEC can be triggered manually employing a rocket motor or a loaded spring. Moreover, a switch could also be used to initiate separation and the sequencing of incinery guillotine devices to separate the AEC from the parent vehicle. Providing an AEC free of explosive and flammable fuels is an integral part of this invention and alone would save numerous deaths resulting from fire and asphyxiation rather than trauma.

A major embodiment of this invention is the unique location and design of the controls surfaces in relation to the wings and AEC. Location of caneleron 2 on the rear of the AEC and forward of the wing provides flight control of the AEC and additional lift and elevator control of the parent vehicle. The canelerons permit elevator and roll control for the AEC when it is separated. When attached to the parent vehicle, the caneleron increases pitch control during normal operation of the aircraft. Enabling good pitch control is critical for safety at low altitudes and supersonic air transports. Military vehicles have even greater requirements for a high level of pitch control during all phases of flight to perform necessary maneuvers.

To quantify this relationship, we use the Elevator Moment Ratio (EMR). EMR is the ratio of the longitudinal distance between the aircraft center of lift and the elevator center of lift, divided by the fuselage length Current supersonic vehicles have EMR less than 0.33 and are unable to benefit from a favorable aerodynamic balance. Future high performance supersonic vehicles must have an EMR greater than 0.33 to meet their stringent weight and balance requirements.

The caneleron described in this invention will contribute to the pitch control of the high performance aircraft, thereby increasing the weight and balance envelope and flight control effectiveness to enhance safety. Loss of pitch control at low altitudes is a major contributor to aircraft fatalities. Additionally, forward flight controls such as the canard have demonstrated excellent pitch control for aircraft flying through transonic speeds.

The flight controls of the caneleron will permit the pilot to operate the left and right caneleron synchronized as a conventional canard, but also to set the respective left and right canelerons differently in relation to each other to provide roll control and trim Operating synchronized canelerons as the AEC is flying independently, they will perform as elevators for pitch control as the AEC flies in a maimer similar to a ling body. An additional embodiment of this invention is a deployable wing 4 to increase range and aerodynamic performance of the AEC.

The AEC 5 will contain all flight controls, escape systems, communications, avionics, life support systems, emergency locator, survivor equipment, flotation devices, weapons systems, parachute systems, speed brakes, impact attenuation devices, and aircraft recording devices. Crew and passengers can remain strapped in their seats until the AEC touches down on land or water. Rescue of the entire crew and AEC can occur utilizing a single hoist connected to the AEC from a ship or helicopter. The ability to quickly retrieve crew and highly classified weapons systems equipment and data contained in the AEC is currently not available to the military and would improve both crew safety and security of classified information and technology. This flight capability of the AEC is also important to help improve the risks associated with combat roles and the avoidance of enemy occupied areas. The ability to select a preferred landing area greatly improves the survivability of a crew in combat situations and also permits choosing a landing area more accessible to rescue in noncombatant scenarios.

The AEC is designed to be air and watertight, yet will have a sump pump in the event of a leak. The flotation devices will be located in a manner such that the AEC will recover from any position in the water to assure the hatch miff be above the water line. The AEC will also provide protection from extreme environments. For instance, without an AEC and the crew is exposed to frigid waters, survival time may be less than a minute.

When used on an extremely fast or orbital vehicle, the AEC is embodied to have thermal insulating material to protect the AEC from thermal dynamic heating associated with supersonic speeds. The AEC can use a high temperature metallic surface to cover the AEC and protect the insulating material. Speed brakes and stabilization-brake parachutes are embodied as the deceleration devices. The Jettisonable Maneuvering Rocket (JMR) segment could also contain reentry deceleration devices and once the AEC has slowed to acceptable speeds, the JMR can be jettisoned.

One embodiment of this AEC is a hatch or door accessing the fuselage in order for passengers or crew in the fuselage to enter the AEC in an emergency. Designed into areas of the AEC are places for individuals and multiple people to be secured for emergency escape. This invention also embodies quick, deployable web netting, to restrain multiple individuals in a prone position to accommodate more people. No existing or commercial or military plane can offer crew and passengers the safety features embodied in this invention.

Test flight planes are necessary to carry the fuels and engines to high altitudes and speeds in order to research and develop the new aerospace(e systems for supersonic and orbital flights. The AEC will provide both safety of the crew and recorded data of the test failure. Retrievable data is essential to learn what caused an aircraft failure and save future lives. Understanding aircraft failures and solving these problems is the best way to improve air safety.

Still another feature of this invention is embodied as an AEC replacement module. Future improvements will necessitate updates to the cockpit, avionics, communications, and escape systems, yet the airframe still has many hours before requiring major overhaul. Using this concept, an entirely new AEC can easily replace an older AEC which would allow aircraft maintenance personnel to greatly reduce aircraft downtime. Reducing downtime of an aircraft is extremely important to commercial aviation and even more crucial in battlefield operations. The AEC offers the military battlefield replacement modules that are not attainable with current method. The military must always consider aircraft damage from combat; therefore quick repairs are a major priority.

Still another embodiment of this invention that has considerable advantages for the military is the Armored Aircraft Escape cabin (AAEC). The AAEC would be designed with bulletproof material beneath the exterior surface of the vehicle to surround the crew and equipment. With bullet proof glass and armored protection, the AAEC will offer the crew and equipment maximum protection during normal flight missions as well as maximum survival protection during explosions, separation, landing and as a bullet proof bunker on the ground. The AAEC carries the necessary weapons to defend the vehicle until rescued. It also carries similar survival equipment as found in the AEC. With good communications, protection from the elements, weapons and armored protection, survival of pilots and crew is dramatically increased. When air support arrives, extraction time is quick and safe due to the singular line required being deployed to attach and lift the entire AAEC with crew and all classified equipment and data The AAEC will also provide protection from ground fire during the extraction.

While the invention has been described in the specification and illustrated in the drawings with reference to a preferred embodiment, it will b understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. In an aircraft, a detachable escape cabin comprising first flight control surfaces extending from said escape cabin, and a pair of second flight control surfaces in the form of wings projecting outwardly from said escape cabin and rearwardly of said wings, one directional release means linking and stabilizing said escape cabin with respect to the parent vehicle, and said release means comprising a first device mounted on said escape cabin and an associated device nestable with said first device mounted on said parent vehicle.

2. An escape cabin according to claim 1 wherein said second flight control surfaces are independently maneuverable.

3. An escape cabin according to claim 1 wherein said escape cabin comprises self-contained propulsion means.

4. An escape cabin according to claim 1 wherein said escape cabin and said parent vehicle are interconnected by means of said release means.

5. An escape cabin according to claim 1 wherein said aircraft includes a jettisonable maneuvering rocket.

6. An escape cabin according to claim 1 wherein the interior of said escape cabin is protected by means of bulletproof material.

7. An escape cabin according to claim 1 wherein the interior of said escape cabin is protected by means of thermal protection material.

8. An escape cabin according to claim 1 wherein said second flight control surfaces provide a control force with respect to said aircraft.

9. An escape cabin according to claim 1 wherein said second flight control surfaces are disposed perpendicular to the axis of said aircraft.

10. An escape cabin according to claim 1 wherein said first device is cone-shaped.

11. An escape cabin according to claim 1 wherein a parachute is attached to said escape cabin to facilitate cabin descent.

* * * * *